US007672983B2

(12) United States Patent
Printezis et al.

(10) Patent No.: US 7,672,983 B2
(45) Date of Patent: Mar. 2, 2010

(54) METHOD AND APPARATUS FOR TRACKING ACTIVITY OF A GARBAGE COLLECTOR WITH A PLURALITY OF THREADS THAT OPERATE CONCURRENTLY WITH AN APPLICATION PROGRAM

(75) Inventors: Antonios Printezis, Burlington, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 605 days.

(21) Appl. No.: 11/305,957

(22) Filed: Dec. 19, 2005

(65) Prior Publication Data

US 2007/0162526 A1 Jul. 12, 2007

(51) Int. Cl.
*G06F 12/00* (2006.01)
(52) U.S. Cl. ........................ 707/206; 718/100
(58) Field of Classification Search ........................ None
See application file for complete search history.

(56) References Cited

U.S. PATENT DOCUMENTS 6,839,726 B2 * 1/2005 Kawamoto .................. 707/206

2003/0005029 A1 * 1/2003 Shavit et al. ................. 709/107
2005/0198088 A1 * 9/2005 Subramoney et al. ........ 707/206
2005/0198635 A1 * 9/2005 Olszewski et al. ........... 718/100
2005/0229176 A1 * 10/2005 Findeisen ................... 718/100

OTHER PUBLICATIONS

Bacon, D., Cheng, P., Rajan, V., "A Real-Time Garbage Collector with Low Overhead and Consistent Utilization", IBM T.J. Watson Research Center, Jan. 15-17, 2003, 14 pages.

* cited by examiner

*Primary Examiner*—Pierre M Vital
*Assistant Examiner*—Truong V Vo
(74) *Attorney, Agent, or Firm*—Osha • Liang LLP

(57) ABSTRACT

The time cost of collecting a region in a Garbage-First garbage collector is adjusted to account for concurrent thread activity. The overhead of a concurrent thread is tracked by dividing elapsed time into relatively short time "windows" and monitoring the system during those windows to determine how long that thread is scheduled to run during those windows. Using measurements of this type for each concurrent thread, the percentage of each elapsed time window dedicated to each concurrent thread is determined. Finally, by summing the percentages of elapsed time dedicated to concurrent thread activity, the cost of collecting a region can be increased by adding the overhead attributable to concurrent activity.

9 Claims, 6 Drawing Sheets

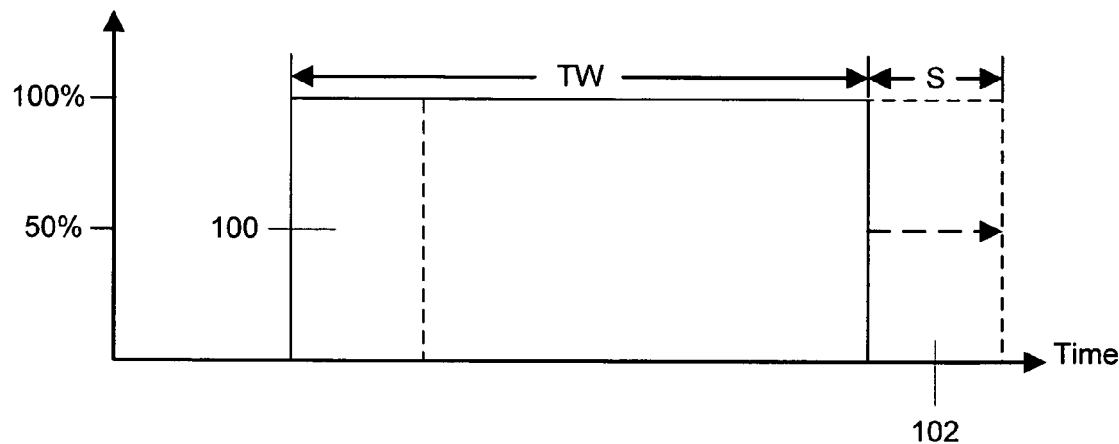
FIG. 1 *(Prior Art)*
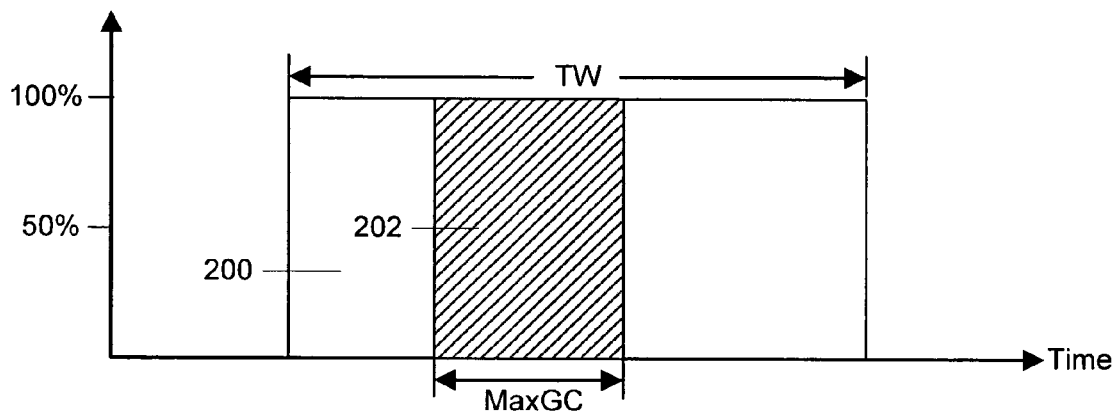
FIG. 2A *(Prior Art)*
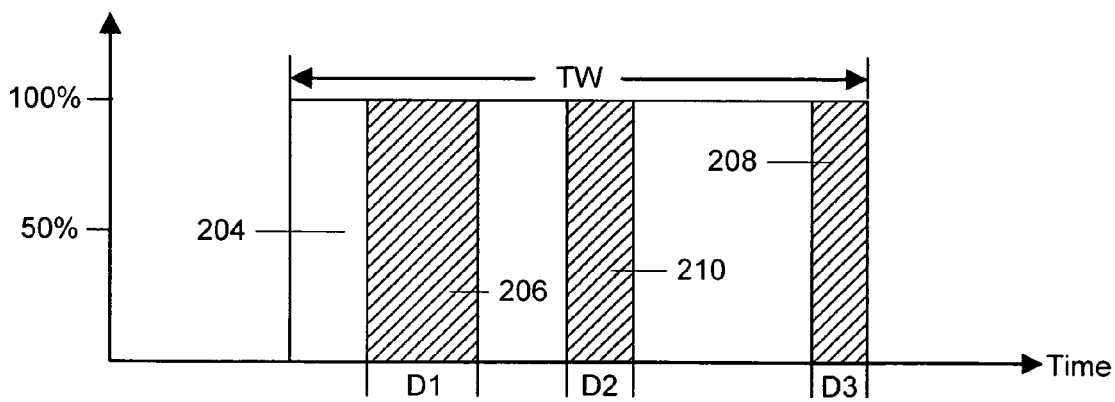
FIG. 2B *(Prior Art)*

METHOD AND APPARATUS FOR TRACKING ACTIVITY OF A GARBAGE COLLECTOR WITH A PLURALITY OF THREADS THAT OPERATE CONCURRENTLY WITH AN APPLICATION PROGRAM

BACKGROUND

This invention relates to automatic reclamation of allocated, but unused memory, or garbage, in a computer system that uses a space-incremental garbage collector to process an object space concurrently with the operation of application threads. Memory reclamation may be carried out by a special-purpose garbage collection algorithm that locates and reclaims dynamically assigned memory (called "heap" memory) that is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms for Automatic Dynamic Memory Management" by Richard Jones and Raphael Lins, John Wiley & Sons, 1996.

However, many of the aforementioned garbage collection techniques often lead to long and unpredictable delays because normal application thread processing must be suspended during the garbage collection process (called "stop the world" or STW processing) and these collectors at least occasionally scan the entire heap memory. Therefore, these techniques are generally not suitable in situations, such as real-time or interactive systems, where non-disruptive behavior is of greatest importance. Several other conventional techniques are typically used to alleviate these delays.

In accordance with one such technique, some garbage collectors operate mostly concurrently with the operation of the application threads. For example, in collectors that mark reachable objects by following references from one object to another, the marking may be done by threads that operate mostly concurrently with the application threads. Memory associated with objects that remain unmarked at the end of the marking operation can then be reclaimed sometimes also concurrently with application execution.

Another solution for limiting pause times is to use a space incremental garbage collector. In such a collector, during each successive collection increment, which typically (but not necessarily) is performed during a single pause in the application execution, the collector processes a small portion, or "collection set", of the heap memory. This approach can often limit pause time adequately without the complexity of requiring the collector to operate concurrently with the application.

However, all of the aforementioned collectors introduce pauses of varying duration. Often the duration of the pauses is difficult to predict so that for some applications these collectors present difficulties. Thus, some collectors allow the user to specify the amount of garbage collection time relative to application execution time so that the worst-case duration of pauses can be predicted. For example, a user might specify that x milliseconds of application execution are to be followed by y milliseconds of garbage collection time. An example of such a garbage collector is described in an article entitled "A Real-time Garbage Collector with Low Overhead and Consistent Utilization", D. F. Bacon, P. Cheng and V. T. Rajan, *Conference Record of the Thirtieth Annual ACM Symposium on Principles of Programming Languages*, ACM SIGPLAN Notices, New Orleans, La. January 2003.

Another similar approach called "Garbage-First" garbage collection uses a space-incremental collection technique and also performs operations, such as marking, concurrently with the operation of the application. This collector allows a user to specify a "soft" real-time goal that garbage collection will consume a maximum of MaxGC milliseconds out of any application execution time window of duration TW milliseconds. This goal is illustrated in the graphs shown in FIGS. 1, 2A and 2B. In these graphs, the horizontal axis represents time increasing towards the right. The vertical axis represents garbage collector overhead increasing in an upwards direction. As shown in FIG. 1, the real-time goal is based on a window 100 of duration TW. This window slides to the right (in the direction of increasing time). For example, the window is shown at position 102 after an elapsed time of S milliseconds.

In FIG. 2A, a STW pause 202 of time duration MaxGC is illustrated as if occurring in time window 200. In this illustration a single pause consumes the entire allotted garbage collection time. Since all application threads are stopped during the pause, the garbage collector overhead rises to 100 percent. A more frequent occurrence is shown in FIG. 2B in which three garbage collection STW pauses 206, 208 and 210 occur in a time window 204 of TW milliseconds duration. In this case the real-time goal would be to make the time durations of these windows less than the allotted garbage collection time: $D1+D2+D3 \leq MaxGC$.

Although the collector does not guarantee to meet this real-time goal, it attempts to do so with high probability. To attempt to achieve the real-time goal, the collector accounts for current garbage collection activity and then schedules future activity. To schedule future activity, the collector deals with heap regions and has a model of the time cost of collecting a particular heap region as a function of quickly-measured properties of that region. Using these time costs, the collector can choose a set of heap regions that can be collected within a given pause time limit (with high probability). Further, collection is delayed if necessary (and possible) until a pause of a given duration can be accommodated to avoid violating the real-time goal.

However, in meeting the real-time goal, the garbage first garbage collector only considers pauses and does not take into account the amount of concurrent marking and summarizing that actually takes place during its operation. Consequently, its predictions are not as accurate as they could be.

SUMMARY

In accordance with the principles of the invention, the time cost of collecting a region in a Garbage-First garbage collector is adjusted to account for concurrent garbage collector thread activity. The overhead of a concurrent garbage collector thread is tracked by dividing elapsed time into relatively short time "windows" and monitoring the system during those windows to determine how long that thread is scheduled to run during those windows. Using measurements of this type for each concurrent garbage collector thread, the percentage of each elapsed time window dedicated to each concurrent garbage collector thread is determined. Finally, by summing the percentages of elapsed time dedicated to concurrent garbage collector thread activity, the cost of collecting a region can be increased by adding the overhead attributable to concurrent activity.

In one embodiment, each concurrent garbage collector thread monitors its own activity and stores information in a data structure that is subsequently read by the garbage collector and used to account for concurrent activity.

In another embodiment, individual garbage collector thread measurements can be smoothed by various techniques to deal with small variations in the measurements.

In still another embodiment, variations in the overhead of the concurrent activity that appear when concurrent marking begins and ends are accounted for explicitly.

BRIEF DESCRIPTION OF THE DRAWINGS

FIG. 1 is a graph that illustrates the time window on which a real-time garbage collection goal is based.

FIG. 2A is a graph that illustrates a time window in which all of the garbage collection activity takes place during a single STW pause.

FIG. 2B is a graph that illustrates a time window in which all of the garbage collection activity takes place during several STW pauses.

DETAILED DESCRIPTION

Figure 3:
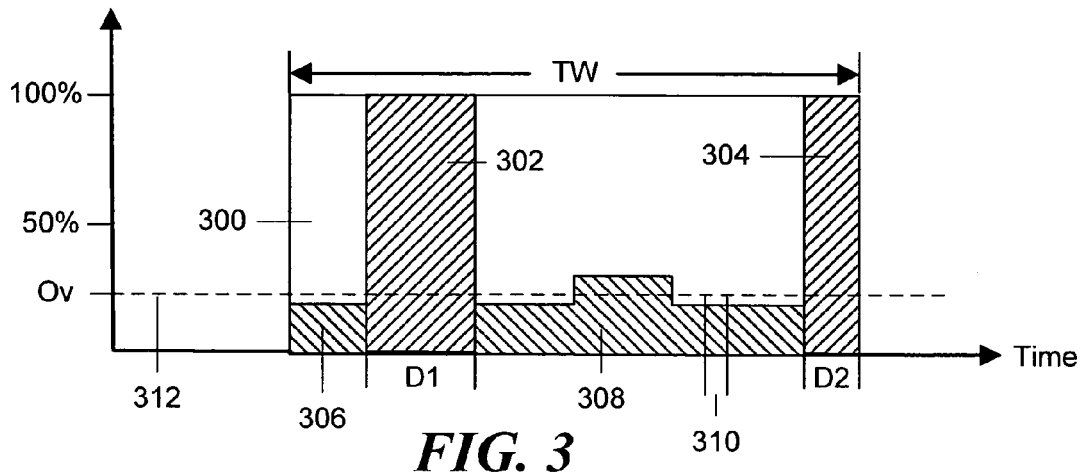
FIG. 3 is a graph that illustrates a time window in which the garbage collection activity takes place during several STW pauses and during concurrent activity that occur continuously during the window.

In the discussion below, a particular garbage collector known as the "Garbage-First" garbage collector is used as an example of a goal-driven, real-time garbage collector. However, those skilled in the art would realize that the principles of the invention apply to other similar goal-driven real-time collectors. The Garbage-First garbage collector is described in general in "Garbage-First Garbage Collection", D. Detlefs, C. Flood, S. Heller and A. Printezis, *Proceedings of the 4th international symposium on Memory management*, pp. 37-48, Vancouver, BC, Canada 2004 and in greater detail in U.S. patent application Ser. No. 10/985,447, filed on Nov. 11, 2004 by D. Detlefs, S. Heller and A. Garthwaite and assigned to the same assignee as the present invention, both documents are incorporated in their entirety by reference herein.

As described in the aforementioned article and patent application, in order to control the operation of the collector, the user supplies a "soft" real-time goal to the garbage collector. This goal is that there must be no more than MaxGC ms of garbage collection time out of any time window of duration TW ms during which the application is executing. The collector then tries to schedule its garbage collection activity to meet this goal with a high probability.

Garbage collection activity in the Garbage-First collector falls into two categories: STW activity that occurs when the garbage collector stops the application to perform an operation that needs to take place atomically with respect to the application and concurrent activity that is performed by threads that operate concurrently with the application. This activity includes concurrent refinement, concurrent zero filling, and concurrent marking. Concurrent refinement and concurrent zero filling are always being performed, whereas concurrent marking is only performed part of the time. These activities are discussed in detail in the aforementioned article and patent application.

Meeting the soft real-time goal requires that individual pauses do not exceed a pause time bound, and that pauses are scheduled so that only the allowed amount of garbage collection activity occurs in any time window. To meet a given pause time bound, a collection set that can be collected in the available time is chosen using the aforementioned time cost model to predict which regions can be collected.

The second requirement for meeting the real-time goal is schedule evacuation pauses so that the garbage collection time in a time window does not exceed the allowed limit. This scheduling is achieved by maintaining a queue of start/stop time pairs for pauses that have occurred in the most recent time window, along with the total stop world time for pauses that have already occurred in that time window. Time pairs for pauses can be inserted at one end of this queue, which updates the start of the most recent time window, and may cause time pairs at the other end to be deleted because they have become irrelevant. This queue is also described in detail in the aforementioned article and patent application. With this data structure, the following two queries can be efficiently answered:

What is the longest pause that can be started now without violating the real-time constraint?

What is the earliest time in the future at which a pause of a given duration may be started?

These queries are then used to decide how long to delay activities that would otherwise be scheduled for processing immediately.

The invention relies on an observation that all of the concurrent activity that the Garbage-First garbage collector performs imposes a substantially uniform overhead on the application (in some cases, like concurrent refinement, deliberate steps were taken to "smooth" the overhead introduced). This activity is shown schematically in the graph illustrated in FIG. 3. A time window 300 of duration TW is illustrated, during which two STW pauses 302 and 304 occur. However, concurrent activity represented by 306 and 308 also occurs throughout the entire window 300. Although this activity varies somewhat over the duration of the window 300 and is the result of a plurality of concurrent threads which start and stop during the window, a substantially constant average level Ov (312) occurs during the time window 300.

Figure 4:
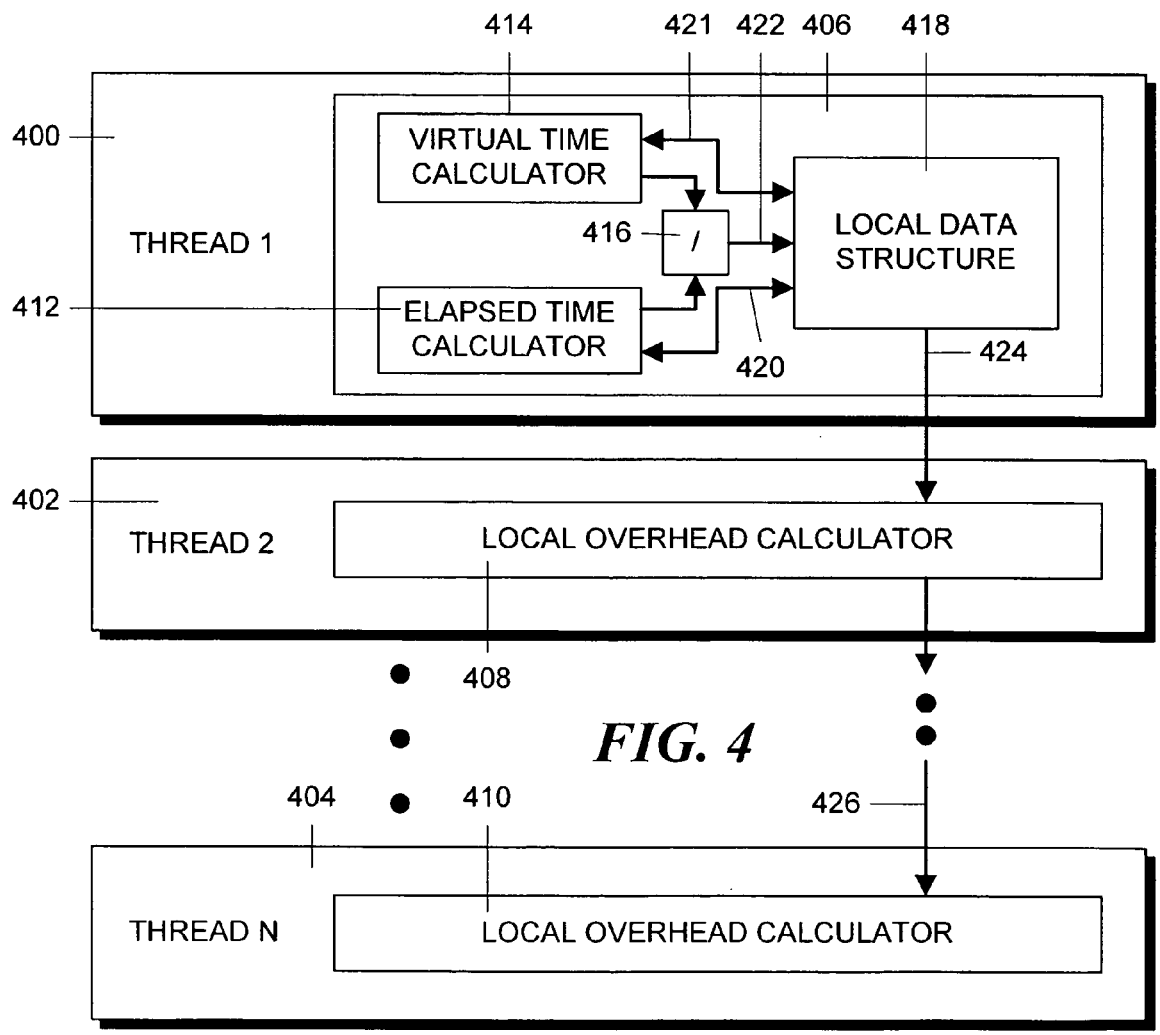
FIG. 4 is a block schematic diagram showing how garbage collector threads that operate concurrently measure their own virtual time within an elapsed time window and store the result in a local data structure.

Based on this observation, the total concurrent overhead can be approximated by calculating a percentage of elapsed time during which each concurrent thread is scheduled and then summing the percentages. In particular, for each concurrent thread, an overhead percentage is calculated by considering a relatively short time window of elapsed time (ET) 310 and determining in that window, the virtual time (VT) during which that thread was scheduled. For example, such a window could be approximately 10 milliseconds in duration if the total time window between STW pauses is approximately 30 milliseconds. This calculation can be performed by a number of methods, however, in accordance with one embodiment; each concurrent thread calculates its own overhead percentage and stores it in a local data structure. This arrangement is illustrated in FIG. 4 which shows a group of concurrent thread structures, of which three, 400, 402 and 404, are illustrated. Each thread structure 400, 402 and 404 includes a local overhead calculator 406, 408 and 410, respectively. As the local overhead calculators 406, 408 and 410 in each thread are the same, only one calculator 406 is shown in detail.

Overhead calculator 406 includes a virtual time calculator 414 and an elapsed time calculator 412. The virtual time calculator 414 first obtains a "virtual" time for the thread, or the time during which the thread has been scheduled since its inception. Typically, this virtual time can be obtained from a facility maintained by the operating system. At the beginning of a time window, the virtual time calculator 414 obtains and stores the virtual time in the local data structure 418 as schematically indicated by arrow 421. The elapsed time calculator 412 also determines the current system time at the beginning of that time window, using for example, a system call that returns the current system time. This elapsed time is then stored in the local data structure 418 as indicated by arrow 420. At the end of the time window, the virtual time calculator 414 again obtains a virtual time for the thread and stores this latter virtual time in the local data structure 418. Similarly, at the end of the time window, the elapsed time calculator 412 again obtains an elapsed time for the thread and stores this latter elapsed time in the local data structure 418.

Later, the garbage collector thread may decide to compute its virtual time (VT), elapsed time (ET) and percentage overhead for the time window (VT/ET). In order to perform this calculation, the virtual time calculator 414 retrieves the stored virtual times for the beginning and the end of the time window from the local data structure 418 and computes the difference (VT) between the starting value and the ending value. The virtual time difference (VT) is provided to a divider 416. The elapsed time calculator 412 also retrieves the stored elapsed times for the beginning and the end of the time window from the local data structure 418 and computes the difference (ET) between the starting value and the ending value. The divider 416 receives the elapsed time difference (ET) from the calculator 412. The divider 416 then computes the overhead percentage Ov(thread 1)=VT/ET and stores this percentage in the data structure 418 as schematically illustrated by arrow 422.

Figure 5:
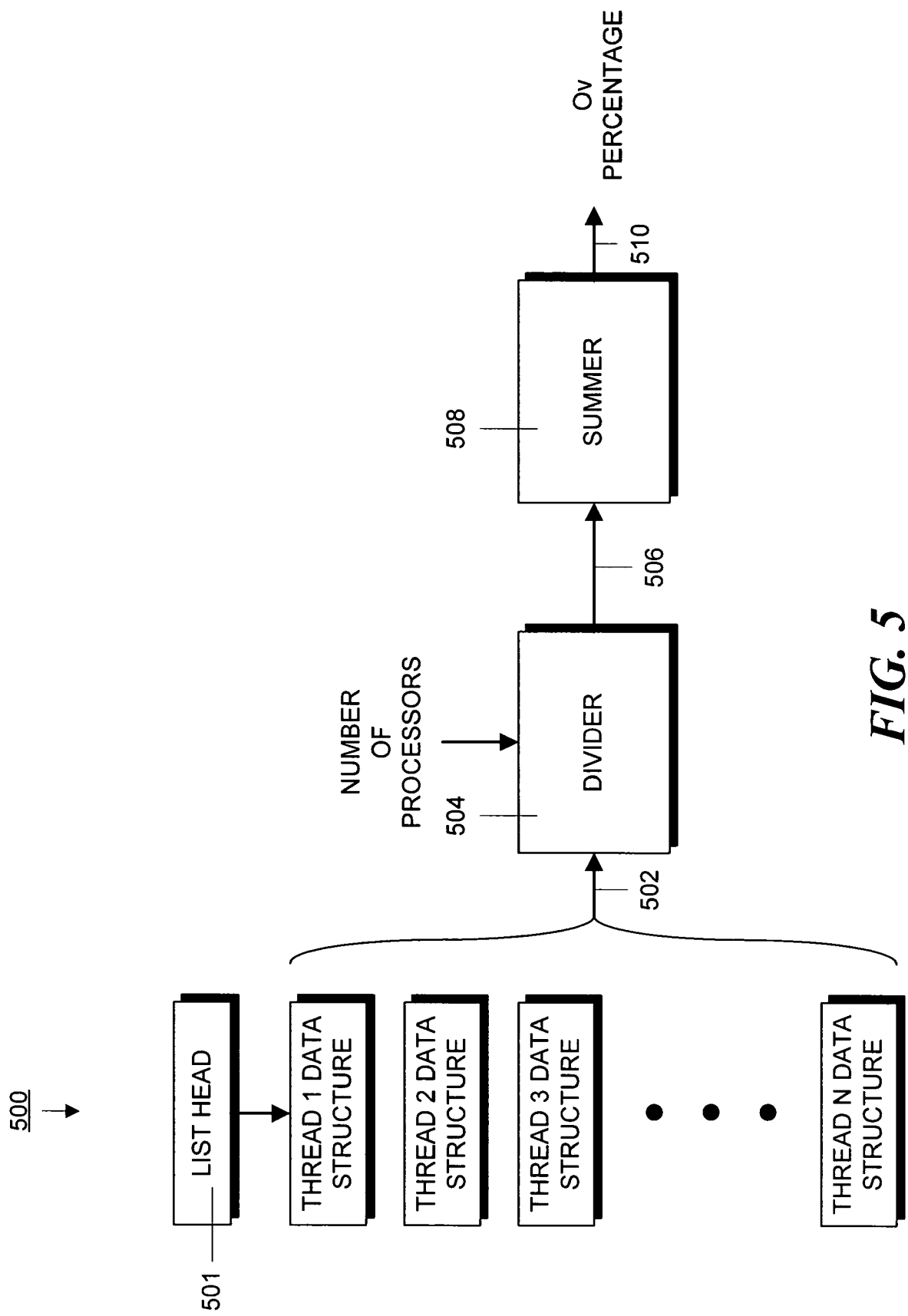
FIG. 5 is a block schematic diagram illustrating the operation of a thread that calculates a total overhead percentage for all concurrent garbage collector threads from the local data structures.
Figure 6:
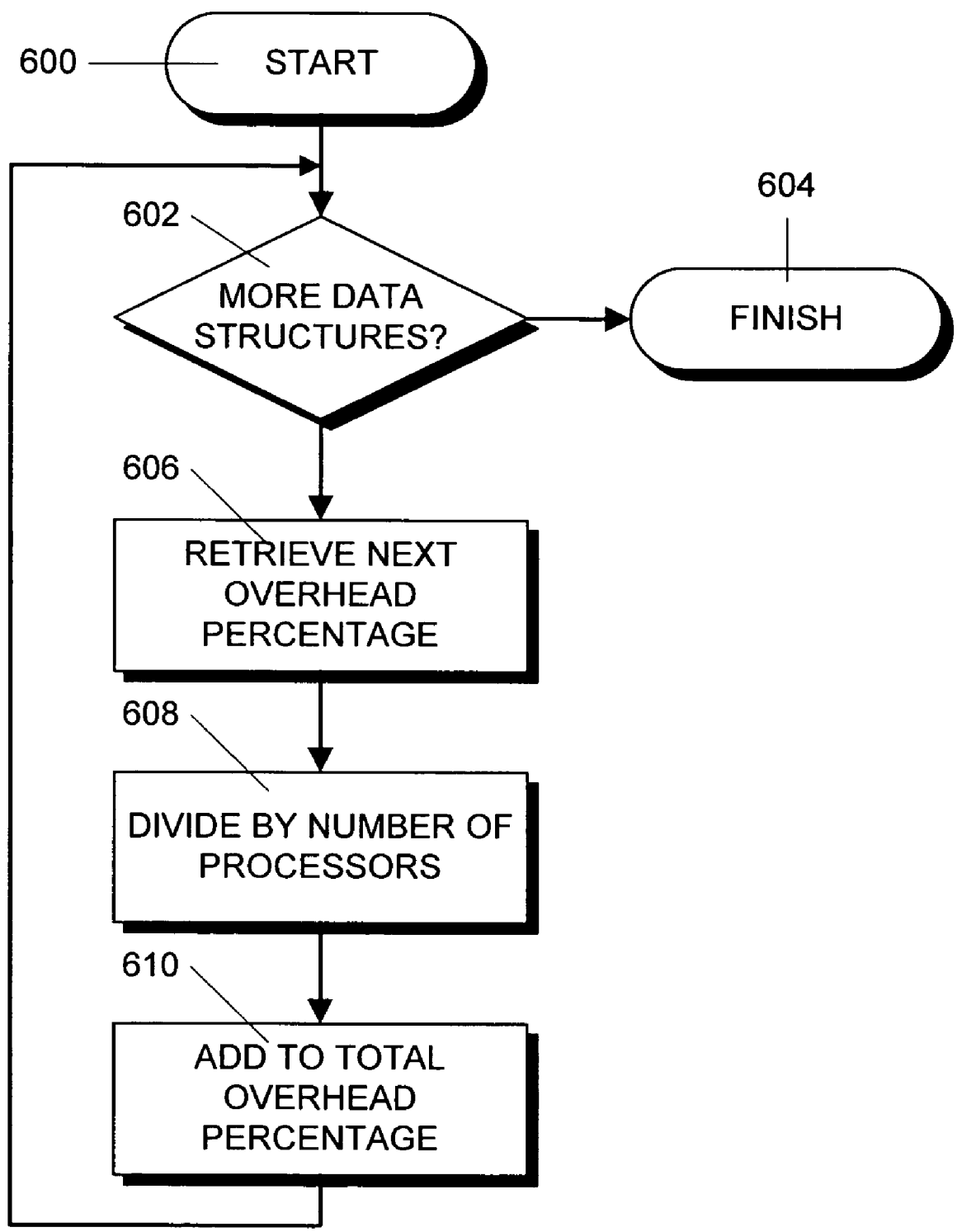
FIG. 6 is a flowchart showing the steps in an illustrative process for calculating an overhead percentage for all concurrent garbage collector threads from the common data structure.

An approximation of the total concurrent overhead Ov can then be computed from the local overhead percentages computed by the concurrent threads. Although these percentages vary over time, the approximation obtained by summing them is reasonably accurate considering, as described above, that the concurrent overhead is typically constant. In general, the total overhead would be calculated periodically at intervals that are determined by the desired "granularity" of the results. For example, the total overhead percentage could be computed at 30 millisecond intervals. In particular, each of the data structures in the local overhead calculators 406, 408 and 410 are linked together so that another thread can iterate over them to retrieve the stored thread overhead percentages. The operation of this other thread is schematically illustrated in FIG. 5 and the steps in the process are shown in FIG. 6. The process begins in step 600 and proceeds to step 602 where a determination is made whether additional thread data structures 500 remain to be processed. Since the data structures are linked together, the first data structure can be located by means of a list head 501 that points to that data structure. Each data structure then points to the next data structure on the list. If additional data structures remain to be processed, then the thread overhead percentage in the next unprocessed data structure is retrieved, as set forth in step 606, and applied to a divider 504, as schematically illustrated by arrow 502. As indicated in step 608, the divider 504 divides the thread overhead percentage by the number of processors. On a multi-processor computer, dividing the overhead percentage computed by a single concurrent thread by the number of processors yields the fraction of all the processors that thread occupied in the elapsed time window 310. For example, for a time window of 10 ms duration, if the virtual time of a concurrent refinement thread is 5 ms, that concurrent refinement thread occupied half a processor for that time window. On a four-processor computer system, that thread would occupy 12.5% of all processors.

Next, the adjusted ratio is applied to a summer 508 as indicated schematically by arrow 506 where, in step 610, the adjusted overhead percentage for that thread is added to the adjusted percentages calculated for other threads. The process then returns to step 602 where a determination is made whether further thread data structures remain to be processed. Operation continues in this manner until all stored thread overhead percentages have been processed. The process then ends in step 604. The total concurrent overhead percentage, Ov, for all threads is then found at the output 510 of the summer 508. Alternatively, the overhead percentages for all threads could be summed and then divided by the number of processors.

Figure 7:
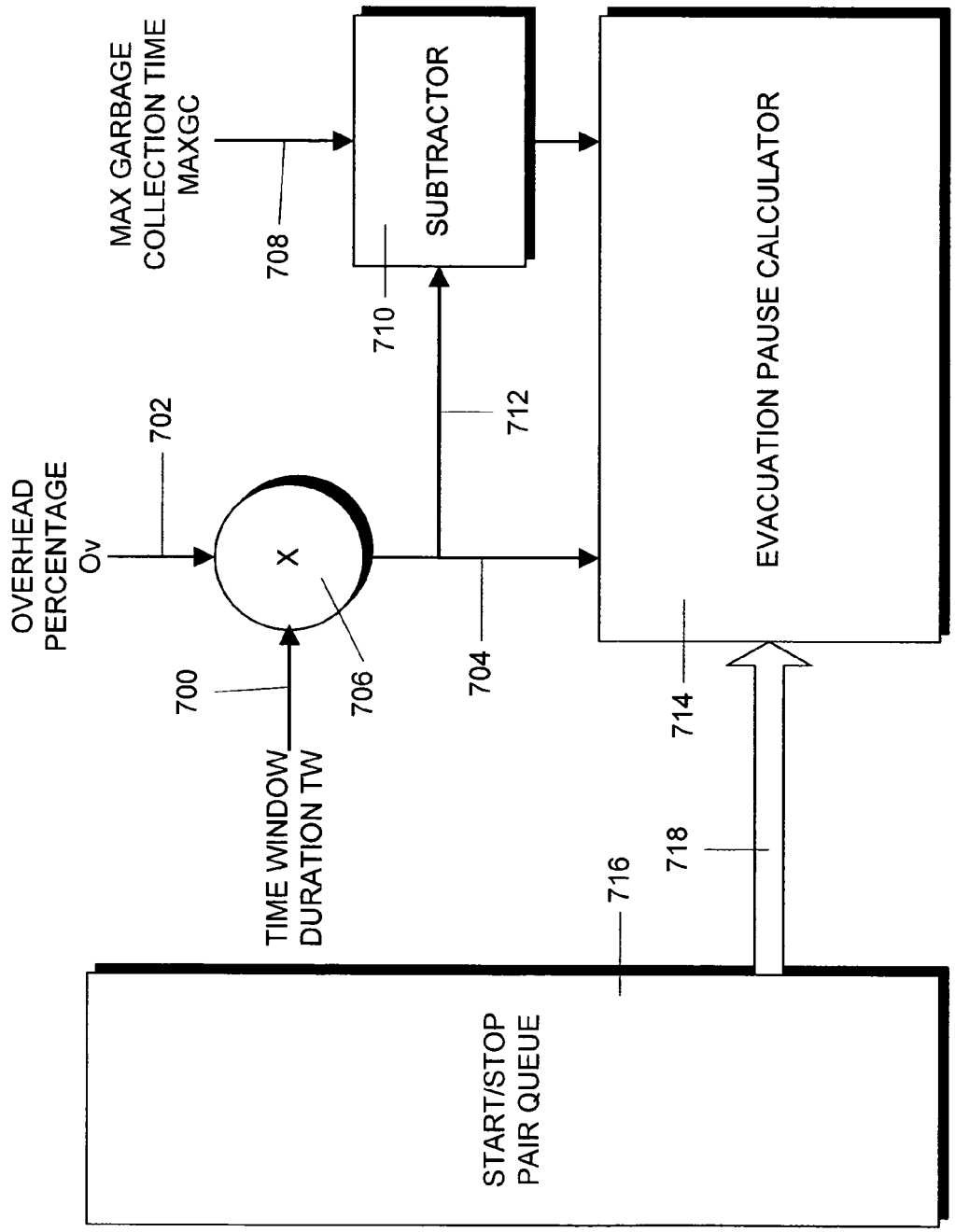
FIG. 7 is a block schematic diagram illustrating apparatus that adjusts query parameters in a Garbage-First garbage collector to account for concurrent thread garbage collector activity.
Figure 8:
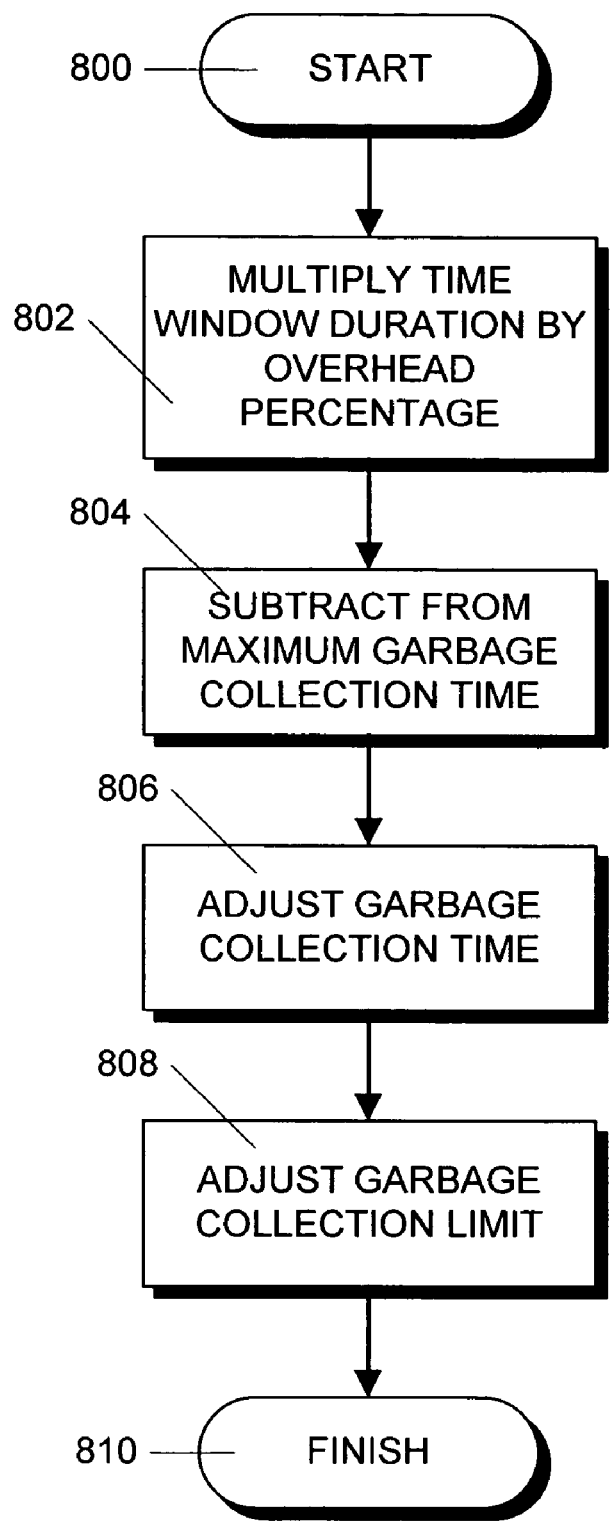
FIG. 8 is a flowchart showing the steps in an illustrative process for adjusting query parameters in a Garbage-First garbage collector to account for concurrent thread garbage collector activity.

Using the calculated estimate of the overhead percentage of the concurrent processes, the aforementioned queries can be adjusted to take this concurrent overhead into account. This process is illustrated in FIGS. 7 and 8. The process begins in step 800 and proceeds to step 802 where the time window duration TW (illustrated as 700 in FIG. 7) is multiplied by the concurrent thread overhead Ov 702 in multiplier 706. The resulting product 712 is applied to a subtractor 710 where, in step 804, the product is subtracted from the maximum garbage collection time MaxGC 708. The product produced by multiplier 706 and the output of subtractor 710 are both applied to the evacuation pause calculator 714 and used to adjust the queries. For example, given a concurrent overhead percentage of Ov, in every time window of duration TW ms used in the queries, the garbage collection activity during that window is adjusted, in step 806, to include TW*Ov of concurrent garbage collection time as well as any STW garbage collection time in the start/stop pair queue 716 as applied to the evacuation pause calculator 714 indicated schematically by arrow 716. Additionally, when STW pauses must be scheduled, the concurrent overhead must be adjusted in step 808 to reduce the maximum pause time allowed for scheduling STW pauses. Specifically, if the maximum pause time is MaxGC, then the maximum pause time adjusted for concurrent activity is MaxGC−Ov*TW. The process then finishes in step 810.

The time estimates may be further improved by taking into account that concurrent garbage collection activities do not take place during STW pauses. Thus, the total garbage collection time can be further adjusted to take this into account. Assuming a goal of MaxGC ms of garbage collection time out of any time window of duration TW ms during which the application is executing and a concurrent overhead percentage Ov (as determined above), then the actual amount of STW time (s) allowed in a time window of TW duration can be determined as follows. If the time during which the application runs is TW−s, then:

Max$GC=s+Ov*(TW-s)$ which can be restated as:

Max$GC=s+Ov*TW-Ov*s$ or $$\mathrm{Max}GC=(I-Ov)*s+Ov*TW$$

so that $$s=(\mathrm{Max}GC-Ov*TW)/(1-Ov)$$

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. The order of the process steps may also be changed without affecting the operation of the invention. Other aspects, such as the specific process flow, as well as other modifications to the inventive concept are intended to be covered by the appended claims.

What is claimed is:

1. A method for tracking activity of a garbage collector with a plurality of garbage collector threads that operate concurrently with an operation of an application program during a time window on a computer system having a number of processors, the method comprising:
    for each of the plurality of garbage collector threads, computing a percentage of the time window during which that garbage collector thread is scheduled for operation;
    dividing each percentage computed by the number of processors to obtain a plurality of adjusted percentages;
    summing the plurality of adjusted percentages to obtain a total overhead percentage;
    multiplying the total overhead percentage computed by a duration of the time window in order to determine a garbage collection time attributable to the plurality of garbage collector threads during the time window;
    adjusting the activity of the garbage collector to include the garbage collection time attributable to the plurality of garbage collector threads during the time window and a garbage collection time attributable to a stop-the-world (STW) garbage collection pause; and
    adjusting a maximum pause time allowed for the STW garbage collection pause.

2. The method of claim 1 wherein each of the plurality of garbage collector threads computes the percentage of the time window during which that garbage collector thread is scheduled for operation and stores the percentage of the time window in a local data structure.

3. The method of claim 1 wherein a total garbage collection time limit is specified by a user and wherein the method further comprises:
    reducing the total garbage collection time limit by the garbage collection time attributable to the plurality of garbage collector threads during the time window.

4. An apparatus for tracking activity of a garbage collector with a plurality of garbage collector threads that operate concurrently with an operation of an application program during a time window, the apparatus comprising:
    a computer system having a number of processors;
    a local overhead calculator in each of the plurality of garbage collector threads that computes a corresponding percentage of the time window during which that garbage collector thread is scheduled for operation; and
    a mechanism executing on the computer system, including:
        a divider that divides the corresponding percentage of each of the plurality of garbage collector threads by the number of processors to obtain a plurality of adjusted percentages;
        a summer that sums the plurality of adjusted percentages to obtain a total overhead percentage;
        a multiplier that multiplies the total overhead percentage computed by the summer by a duration of the time window in order to determine a garbage collection time attributable to the plurality of garbage collector threads during the time window; and
        an evacuation pause calculator that:
            adjusts the activity of the garbage collector to include the garbage collection time attributable to the plurality of garbage collector threads during the time window and a garbage collection time attributable to a stop-the-world (STW) garbage collection pause; and
            adjusts a maximum pause time allowed for the STW garbage collection pause.

5. The apparatus of claim 4 wherein each local overhead calculator comprises a mechanism that stores the corresponding percentage of each of the plurality of garbage collector threads in a local data structure stored on the computer system.

6. The apparatus of claim 4 wherein a total garbage collection time limit is specified by a user and wherein the apparatus further comprises a mechanism that reduces the total garbage collection time limit by the garbage collection time attributable to the plurality of garbage collector threads during the time window.

7. A computer readable medium storing instructions for tracking activity of a garbage collector with a plurality of garbage collector threads that operate concurrently with an operation of an application program during a time window, the instructions executable on a processor and comprising functionality to:
    compute, for each of the plurality of garbage collector threads, a corresponding percentage of the time window during which that garbage collector thread is scheduled for operation;
    divide the corresponding percentage of each of the plurality of garbage collector threads by the number of processors to obtain a plurality of adjusted percentages;

sum the plurality of adjusted percentages to obtain a total overhead percentage;

multiply the total overhead percentage by a duration of the time window in order to determine a garbage collection time attributable to the plurality of garbage collector threads during the time window;

adjust the activity of the garbage collector to include the garbage collection time attributable to the plurality of garbage collector threads during the time window and a garbage collection time attributable to a stop-the-world (STW) garbage collection pause; and adjust a maximum pause time allowed for the STW garbage collection pause.

8. The computer readable medium of claim 7, wherein the instructions further comprise functionality to store the corresponding percentage in a local data structure on the computer system.

9. The computer readable medium of claim 7, wherein a total garbage collection time limit is specified by a user, and wherein the instructions further comprise functionality to:

reduce the total garbage collection time limit by the garbage collection time attributable to the plurality of garbage collector threads during the time window.

* * * * *